United States Patent Office 3,088,870
Patented May 7, 1963

3,088,870
LOW VOLUME CONTACT LAXATIVE ENEMA COMPOSITIONS
Charles Byron McDermott, 1450 Broadway, New York, N.Y.
No Drawing. Filed Nov. 25, 1958, Ser. No. 776,199
3 Claims. (Cl. 167—56)

This invention relates to purgatives and more particularly to purgative compositions for preparing the colon for either X-ray examination or surgery.

One of the most essential conditions for obtaining satisfactory roentgenograms is that the intestines be cleaned efficiently, particularly with regard to the elimination of gas from the colon. The same condition applies when the colon is preoperatively prepared for surgery. In any case, it is usually necessary to employ oral cathartics and repeated washout enemas to clear the colon preparatory to either roentgenographic examination or surgery.

While a number of agents are known which can be used to empty the colon, they all suffer certain disadvantages such as irritation, necessity for large volumes of water and delayed evacuation from the colonic region.

My invention provides enema compositions affording in aqueous solution a contact laxative agent causing peristalsis in the colon in sufficient concentration for laxation without the need for excessive amounts of water. To obtain the compositions of the invention, I have used propylene glycol and a small percentage of a non-ionic wetting agent such as an alkylaryl polyether alcohol. The amount of the propylene glycol is maintained at a level which is below the irritant concentration yet sufficient ot keep the laxative agent in aqueous solution by the solubilizing effect of the alkylaryl polyether alcohols. Thus, the combined solubilizing effect of the propylene glycol and polyether alcohol is manifested in compositions requiring about one-tenth the volume of water hitherto required for effective cleansing of the colonic region of the large intestine.

The compositions of the invention produce a moderate cathartic effect on the colon causing a local stimulant effect on the mucous membranes of the large intestine. Gas or feces are promptly evacuated insuring a clear, clean colon for roentgenographic visualization or for surgery.

The compositions of the present invention are used in the form of enemas which can be employed either alone or as an adjuvant to a suspension of a contrast media as for example, barium sulfate.

The compositions of the invention are prepared by dissolving the laxative agent in water containing a small quantity preferably from 3% to about 7% propylene glycol and from 0.05% to about 0.20% of the alkylaryl polyether alcohol. The amount of alkylaryl polyether alcohol is preferably from five to ten times that of the laxative agent.

The alkylaryl polyether alcohols useful in the compositions of the invention are the surface active wetting and penetrating agents described in U.S. Patent 2,454,541, which are oxyethylated alkylphenol-formaldehyde polymers prepared by condensing an alkylphenol with 0.5–1.0 mole of formaldehyde and reacting the product thus obtained with 8–60 moles of ethylene oxide. Particularly useful alkylaryl polyether alcohols are the oxyethylated p-tertiary octylphenol-formaldehyde polymers produced by condensing approximately equimolar amounts of p-tertiary octylphenol and formaldehyde and then reacting the product with 10–20 moles of ethylene oxide. A preferred compound of this group contains ten ether groups per p-tertiary octylphenol nucleus which is known under the brand names "Superinone" and "Triton WR-1339" and generically as tyloxapol.

Suitable contact laxative agents causing peristalsis and capable of emptying the colon include certain isatin derivatives, for instance 3,3-bis(4-hydroxyphenyl)oxindole, anthraquinone derivatives such as 1,8-dihydroxyanthraquinone, bis(p-acetoxyphenyl)-2-pyridylmethane and phenolphthalein.

The compositions of the invention are used in the form of enema solutions prepared by dissolving the laxative agent in propylene glycol containing if desired preservatives as, for example, methyl p-aminobenzoate and propyl p-aminobenzoate. The alkylaryl polyether alcohol in distilled water is then added in such an amount that one liter of enema solution will contain the relative proportions of laxative agent and aralkyl polyether alcohol given above. When prepared in this preferred manner the laxative component is easily and quickly dissolved and results in a clear solution after the addition of water.

A particularly preferred embodiment of the invention comprises a composition having about 0.01% 3,3-bis(4-hydroxyphenyl)oxindole dissolved in an aqueous solution containing about 5% propylene glycol and about 0.075% Superinone.

The following examples will further illustrate the invention without however limiting the latter thereto.

*Example 1*

| | | |
|---|---|---|
| 3,3-bis(4-hydroxyphenyl)oxindole | mg— | 111 |
| Superinone | mg— | 750 |
| Methyl p-hydroxybenzoate | mg— | 850 |
| Propyl p-hydroxybenzoate | mg— | 150 |
| Propylene glycol | cc— | 50 |
| Water, q.s. ad | cc— | 1000 |

The 3,3-bis(4-hydroxyphenyl)oxindole and preservatives are dissolved in the propylene glycol with warming. The remaining components are then added and the composition brought to 1,000 cc. with water. This solution is preferably filled into 210 cc. plastic squeeze bottles designed to deliver on the average 180 cc. with one squeeze of the bottle. The solution delivered therefore contains 20 mg. (0.011%) of 3,3-bis(4-hydroxyphenyl)-oxindole in an aqueous vehicle containing 5% propylene glycol and 0.075% Superinone. The cleansing action of the solution is as effective as that obtained when the laxative agent is dissolved in one to two liters of water alone as has been the practice hitherto.

*Example 2*

| | | |
|---|---|---|
| 3,3-bis(4-hydroxyphenyl)oxindole | mg— | 400 |
| Superinone | mg— | 2000 |
| Methyl p-hydroxybenzoate | mg— | 850 |
| Propyl p-hydroxybenzoate | mg— | 150 |
| Propylene glycol | cc— | 50 |
| Distilled water, q.s. ad | cc— | 1000 |

The composition is formulated in the same manner as that described above in Example 1 and contains 40 mg. (0.04%) of laxative agent per 100 cc. of solution. This solution provides the laxative agent in a concentration several times that possible when water alone is used as a solvent.

I claim:
1. An aqueous composition for cleansing the colonic region of the large intestine comprising 0.01 to 0.04% of a contact laxative agent causing peristalsis in the colon, from about 3 to about 7% propylene glycol and about 0.05 to about 0.20% oxyethylated p-tertiary octylphenol-formaldehyde polymer in water, affording in solution a sufficient concentration of the agent to cause peristalsis by enemas of low volume.

2. An aqueous composition in accordance with claim 1 where the laxative agent is 3,3-bis(4-hydroxyphenyl)oxindole.

3. An aqueous composition in accordance with claim 1 comprising about 0.01% 3,3-bis(4-hydroxyphenyl)-oxindole, about 5% propylene glycol and about 0.075% oxyethylated p-tertiary octylphenol-formaldehyde polymer.

References Cited in the file of this patent

UNITED STATES PATENTS 2,454,541   Bock _____ Nov. 23, 1958

OTHER REFERENCES

J.A.M.A., vol. 158, No. 4, May 28, 1955, pages 261–263 (167–56).

Pharmaceutical Formulas, vol. 1, 12th edition, 1953, Chemist and Druggist, London, pages 211 and 215.

U.S. Dispensatory, 25th edition, 1955, pages 1134 and 1135, Lippincott Co., Phila., Pa.

Modern Drug Encyclopedia, 7th ed., Feb. 17, 1958, p. 468, "Fleet Enema."

Merck Index, 7th ed., 1960, p. 796.

UNITED STATES PATENT OFFICE
CERTIFICATE OF CORRECTION

Patent No. 3,088,870                      May 7, 1963

Charles Byron McDermott

It is hereby certified that error appears in the above numbered patent requiring correction and that the said Letters Patent should read as corrected below.

In the grant, lines 1 to 3, for "Charles Byron McDermott, of New York, N. Y.," read -- Charles Byron McDermott, of New York, N. Y., assignor to Sterling Drug Inc., of New York, N. Y., a corporation of Delaware, --; line 12, for "Charles Byron McDermott, his heirs" read -- Sterling Drug Inc., its successors --; in the heading to the printed specification, lines 4 and 5, for Charles Byron McDermott, 1450 Broadway, New York, N. Y." read -- Charles Byron McDermott, New York, N. Y., assignor to Sterling Drug Inc., New York, N. Y., a corporation of Delaware --.

Signed and sealed this 12th day of November 1963.

(SEAL)
Attest:

ERNEST W. SWIDER

Attesting Officer

EDWIN L. REYNOLDS

Acting Commissioner of Patents